Aug. 10, 1937.  J. MERCIER  2,089,657
DAMPING DEVICE
Filed June 22, 1933   3 Sheets-Sheet 1
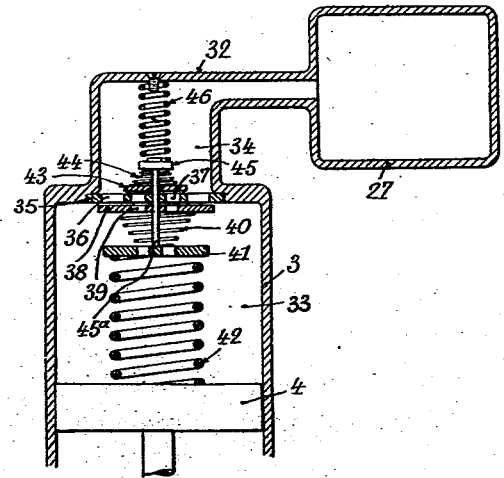
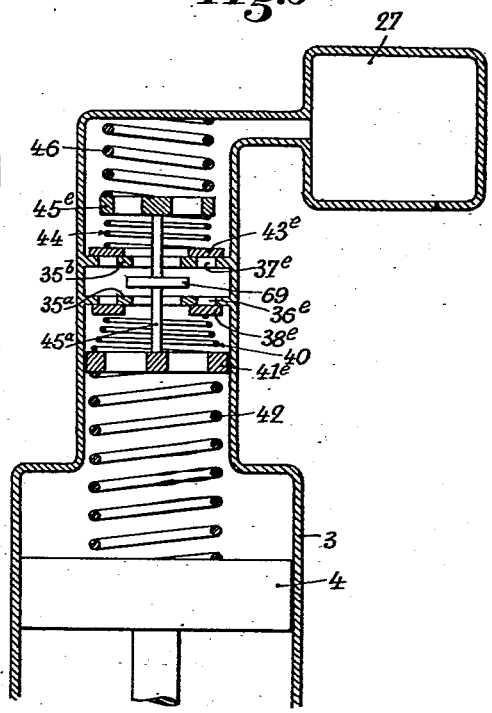
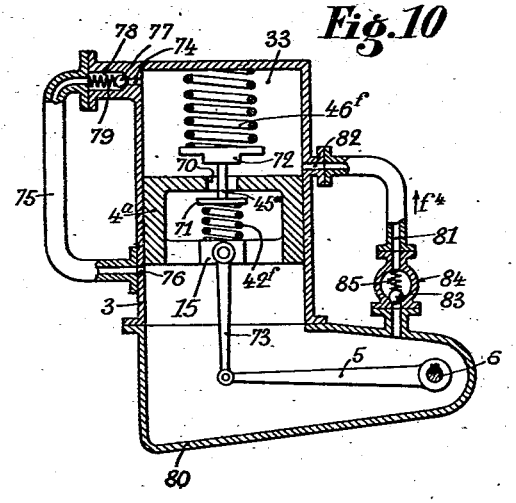
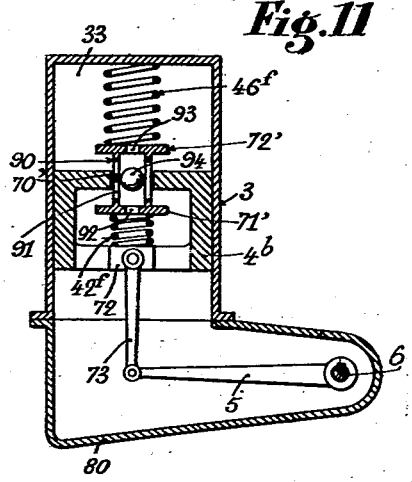
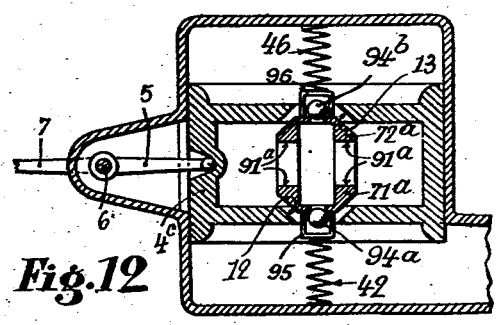
Jean Mercier
INVENTOR
his ATTY.

Aug. 10, 1937.     J. MERCIER     2,089,657
DAMPING DEVICE
Filed June 22, 1933     3 Sheets-Sheet 2

Jean Mercier
INVENTOR
By
his Attorney

Aug. 10, 1937. J. MERCIER 2,089,657
DAMPING DEVICE
Filed June 22, 1933 3 Sheets-Sheet 3

Jean Mercier
INVENTOR

Patented Aug. 10, 1937

2,089,657

UNITED STATES PATENT OFFICE 2,089,657

DAMPING DEVICE

Jean Mercier, Neuilly-sur-Seine, France

Application June 22, 1933, Serial No. 677,071
In France July 5, 1932

11 Claims. (Cl. 188—88)

Damping devices or shock absorbers between two elements whose relative displacements are to be damped are already known in which a deformable container which has two opposite walls respectively connected with said two elements communicates with an auxiliary chamber through communicating passages provided in a partition separating said container from said chamber and adapted to be intercepted by valve means allowing a fluid to flow freely between the deformable container and the auxiliary chamber when the volume of the deformable container varies from its initial value and opposing on the contrary said fluid flow when the volume of the deformable container returns to said initial value.

The present invention relates to a damping device of the above mentioned type, in which a sliding member adapted to slide in said partition is subjected at its opposite ends to the action of two springs compressed and expanded by the relative displacements of said opposite walls and cooperates with valve means adapted to open and to close two communicating means between said deformable container and said auxiliary chamber, said two communicating means being closed by said valve means for relative displacements between said walls in opposite directions, in such manner as to close only one of said communicating means for a relative displacement between said opposite walls away from the initial position and to close said two communicating means at the beginning of a relative displacement between said opposite walls towards their initial position.

Due to said arrangement, the valve means may operate with all the desirable freedom under the effect of the differences of pressure existing between the deformable container and the auxiliary chamber when the elements to be damped are moved away from their initial position and the springs intervene only in order to control the opening of said valve means when the elements are returned to their initial position.

In the accompanying drawings, which are given solely by way of example:

Fig. 1 is a diagrammatic vertical section of a double-acting shock-absorber of the reciprocating piston and cylinder type.

Fig. 9 shows a modification of the shock-absorber represented in Fig. 1.

Figs. 10, 11 and 12 show vertical sections of three other shock-absorbers, in which the valves are combined with the piston itself.

Figure 2:
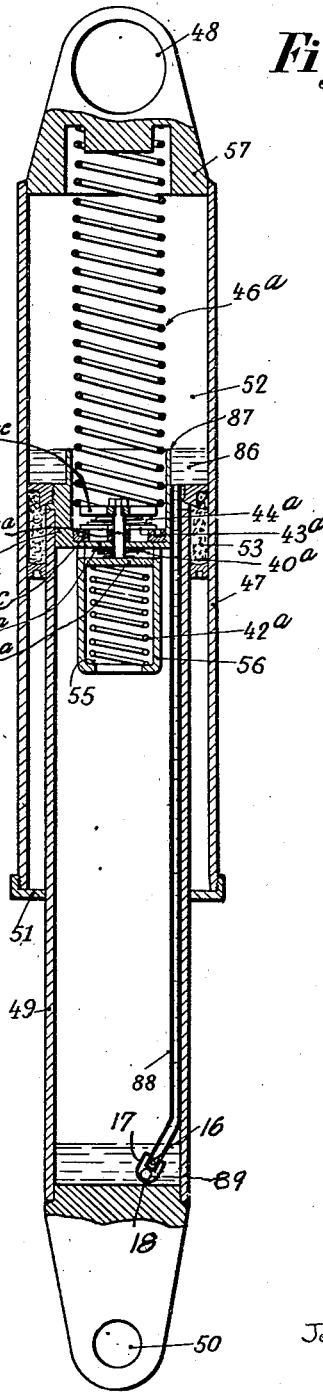
Fig. 2 is a vertical section through a shock absorber for use with the landing gear of an aeroplane.
Figure 3:
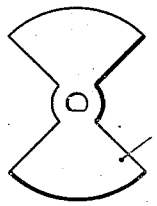
Fig. 3 is a plan view of the upper member in contact with the spring controlling the upper valve of the shock-absorber shown in Fig. 2.
Figure 4:
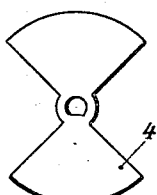
Fig. 4 is a plan view of the upper valve.
Figure 5:
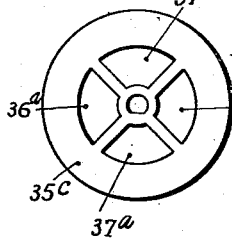
Fig. 5 is a plan view of the seating for the valves.
Figure 6:
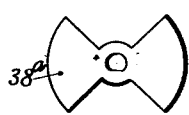
Fig. 6 is a plan view of the lower valve.
Figure 7:
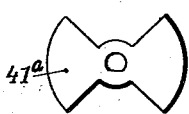
Fig. 7 is a plan view of the lower member in contact with the spring controlling the lower valve.

In the construction shown in Fig. 1, the shock-absorber is adapted for damping the displacements of the axle of a vehicle with reference to the longitudinal side member of the vehicle frame. The shock-absorber consists of a cylinder 3 which is secured to the longitudinal side member. A piston 4 is adapted to reciprocate in the cylinder 3 and is operatively connected with the vehicle axle.

An auxiliary chamber 27 communicates with the upper chamber 33 formed in the cylinder 3 above the piston 4, through a secondary chamber 34.

Between the chamber 33 and the secondary chamber 34 is located a disc 35 fixed in position and pierced with two sets of apertures 36 and 37. The outer apertures 36 are normally closed by a disc 38 which is perforated at 39 near the center. The disc 38 is normally held upon its seating by a weak spring 40 bearing against a disc 41 which is connected with the piston 4 by a much stronger spring 42.

The central apertures 37 of the disc 35 are in like manner closed by a disc 43 which is pressed upon its seating by a spring 44 which bears upwardly against a disc 45 connected with the disc 41 by a rod 45ª which is slidable, with the minimum amount of play, in the discs 43, 35 and 38.

A spring 46 which is weaker than the spring 42, is mounted between the top of the disc 45 and the wall 32 of the secondary chamber 34.

In the middle position shown under the action of the springs 40 and 44, the discs 38 and 43 are pressed upon their seatings, and all connection is cut off between the chamber 33 and the secondary chamber 34.

When the piston 4 rises it displaces the spring 42; the disc 41 together with the disc 45 will rise, and due to this motion, the spring 40 is compressed and the disc 38 is strongly held upon its seating. On the contrary, the pressure on spring 44 is released, and thus the fluid in the chamber 33 will pass without difficulty into the secondary chamber 34 and thence into the auxiliary chamber 27 through the central apertures 39—37 of the discs 38—35, the valve 43 being readily raised from its seating. When the piston 4 returns to its middle position, the fluid contained in the chamber 27 and in the secondary chamber 34 cannot flow in the same path in order to return to the chamber 33, as the valve 43 is now pressed against its seating, and the fluid must thus pass through the outer apertures 36 of the disc 35, thus raising the valve 38 which is more strongly pressed by the spring 42 according as the piston 4 has moved to a greater distance from its middle position during the rising motion. This will afford the desired rate of decreasing resistance according as the piston 4 returns to its mean position.

If when starting from the idle position herein represented, the piston 4 descends, the operation is the reverse of what has been described. In fact, the combination 41—45 descends, the spring 44 is compressed, thus pressing the valve 43 strongly upon its seating. On the contrary, the spring 40 expands, and the fluid can readily pass through the orifices 36 of the secondary chamber 34 into the chamber 33. During the rise of the piston 4 towards its middle position, the valve 38 is pressed upon its seating, and the fluid must flow through the orifices 39 and 37 in order to pass into the secondary chamber 34, thus raising the valve 43 which is pressed more strongly upon its seating according as the piston has descended to a greater distance from its middle position.

The fluid contained in the chambers 27, 33 and 34 may be air or another gaseous fluid; it is also possible to introduce oil or another liquid in the chambers 33 and 27, but the presence or the absence of oil or another liquid is independent of the object of the invention. When more oil is introduced into the device, said device will be strong springing; on the contrary, when there is no oil or but a little oil in the device, said device will be weak springing.

Figs. 2 to 7 represent the use of the shock-absorber shown in Fig. 1 upon the landing gear of an aeroplane. In this case, the two elements whose relative displacements are to be damped when they return to their middle position, consist of a cylinder 47 which is secured at 48 to the structure of the aeroplane, and of a second cylinder 49 secured at 50 to the landing gear. The cylinder 49 enters the cylinder 47 through its bottom part 51. The upper chamber 52 provided in the cylinder 47 is made non-leaking by a stuffing-box 53 which is mounted between the upper end of the cylinder 49 and the outer cylinder 47.

The upper end of the cylinder 49 carries a ring-shaped member 54 serving as a support for the system of valves which will be further described. To the said member is secured a disc 35ᶜ (Figs. 2 and 5) pierced with two sets of apertures 36ᵃ—37ᵃ which are in the alternate position from one set to another. The apertures 36ᵃ are normally closed by a valve 38ᵃ (Figs. 2 and 6) having the form of a double sector and held upon its seating by a spring 40ᵃ bearing against a double sector 41ᵃ (Figs. 2 and 7), which bears, through the medium of a spring 42ᵃ, upon the lower shoulder 55 of a cylinder or like support 56 forming part of or separately secured to the ring 54. The other sets of apertures 37ᵃ are closed by a valve 43ᵃ (Figs. 2 and 4) having the form of a double sector and applied on its seating by a spring 44ᵃ bearing upon a plate 45ᶜ having the form of a double sector (Figs. 2 and 3) and connected by the rod 45ᵃ with the double sector 41ᵃ. A spring 46ᵃ bears at one end upon the plate 45ᶜ and at the upper end against the inner end 57 of the chamber 52. As will be noted, the compression of the spring 46ᵃ depends upon the relative position of the two cylinders 47 and 49 whose return motion towards the middle position is to be damped.

The whole device is filled with compressed air or other fluid.

The operation of the said device is quite the same as described with reference to Fig. 1.

Before the landing takes place, the cylinder 49 is in the lower position. During the landing, the cylinder 49, in order to be able to rise, must overcome the pressure prevailing in the chamber 52, as the counter-pressure due to the difference between the forces of the springs 42ᵃ and 46ᵃ prevents the compressed fluid from proceeding into the hollow piston 49. Thus the landing gear absorbs more energy than a system of the piston type without the valve according to the invention. If the flow sections are properly calculated, the internal friction of the compressed air will still further increase the energy absorbed.

It should be noted that the relative displacements of the cylinders 47 and 49 make it necessary to employ a suitable lubrication for the surfaces in contact. This will be assured by a lubricant placed in the annular space 86 between the cylinder 47 and the extended part 87 of the member 54.

The lubricant which flows into the lower part of the cylinder 49 through the set of valves, will be raised in any suitable manner, for instance by a tube 88, provided at the lower end with holes 16 communicating with a box 17 which in turn is provided with an aperture 18 adapted to be closed by a valve 89. When the pressure of the fluid in the lower part of the cylinder 49 increases, the lubricant contained in this cylinder will be driven through the aperture 18, the box 17, the holes 16 and the tube 88 into the supply chamber 86. The lubricant further assures non-leaking conditions for the devices.

Figure 8:
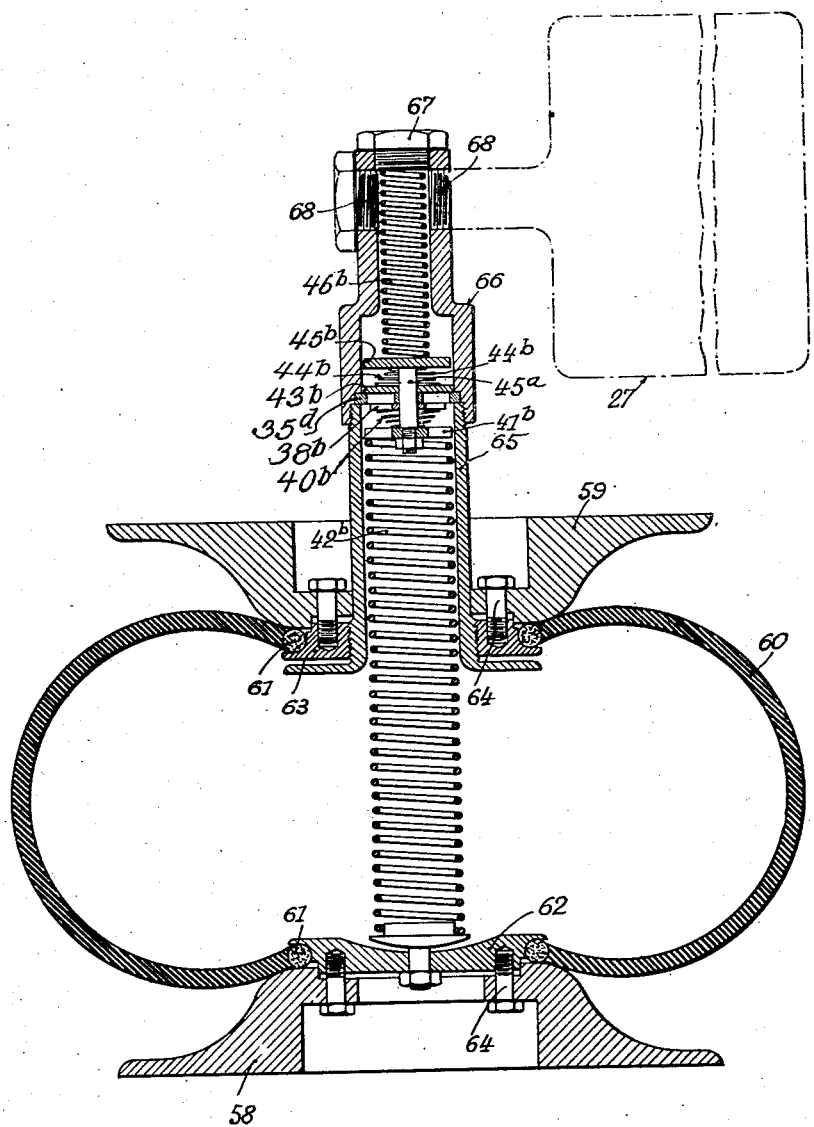
Fig. 8 is a vertical section of another shock-absorber in which the chamber connecting the two elements whose relative displacements are to be damped consists of an elastic casing.

Fig. 8 shows a shock-absorber which is quite analogous to the one represented in Fig. 2, but which is chiefly adapted for damping the relative displacements of a vehicle axle and frame.

The said shock-absorber comprises two supports 58—59 which are secured respectively to the axle and to the frame of the vehicle. Between the two supports is mounted, in the known manner, a torus-shaped flexible casing 60 which is held by its edges 61 upon the supports 58—59 by means of a disc 62 and a ring 63, which are mounted on the supports by screws 64. The upper support 59 is upwardly extended by two tubes 65 and 66 which are secured together. The upper tube 66 is closed at the top by a plug 67, and may be connected with one or more chambers 27. Of the two orifices 68, the one which is not connected with a chamber 27 will be obviously closed. Between the tubes 65 and 66 is mounted a disc 35ᵈ resembling the one shown in Figs. 2 and 5 and having two sets of apertures which are respectively closed by two double sectors 38ᵇ and 43ᵇ, pressed upon their seatings by respective springs 40ᵇ and 44ᵇ. The said springs bear respectively upon double sectors 41ᵇ and 45ᵇ which are connected together by the rod 45ᵃ. The device formed by the two sectors is in equilibrium for each relative position of the supports 58 and 59 between two springs 42$^b$ and 46$^b$.

The operation is quite the same as described with reference to Fig. 1.

Fig. 9 represents a modification of the device shown in Fig. 1, in which the disc 35 is replaced by two annular shoulders 35$^a$ and 35$^b$, in which are respectively provided the apertures 36$^e$ and 37$^e$ cooperating with the valves 38$^e$ and 43$^e$. The closing of the central apertures of the shoulders 35$^a$—35$^b$ is assured, when the piston 4 leaves the middle position, by a disc 69 mounted on a rod 45$^a$ by which the supporting members 41$^e$ and 45$^e$ are connected together.

The operation is the same as in the preceding cases.

Fig. 10 represents another construction, in which the piston 4$^a$ itself forms part of the valve system. Herein the piston 4$^a$ is pierced with an orifice 70 which may be closed by one or the other of two solid discs 71—72 which are connected together axially by a rod 45$^a$; two springs 42$^f$—46$^f$ are respectively in contact with the said discs. The spring 46$^f$ also bears against the end of the cylinder, whilst the spring 42$^f$ bears against a boss 15 pertaining to the piston 4$^a$, by which the piston is connected with the operating rod 73. The upper part of the cylinder communicates by means of an orifice 74 and a conduit 75, with an orifice 76 in the said cylinder which is located just below the lower part of the piston when the latter is in the middle position. A ball 77 contained in a small chamber 78 is normally pressed against the orifice 74 by a spring 79.

The case 80 which is mounted below the piston 4$^a$ communicates through a conduit 81 with an orifice 82 formed in the wall of the cylinder 3 just above the piston 4$^a$, when the latter is in the middle position. A ball or like valve 83 is contained in a small casing 84 mounted on the conduit 81 and is pressed upon its seating by a spring 85, thus allowing the liquid to circulate in the said conduit only in the direction of the arrow $f^4$.

The operation is as follows: Let it be supposed that the piston 4$^a$ rises above its middle position. The piston at once closes the orifice 82, and thus the liquid in the upper chamber 33 can only proceed into the case 80 through the conduit 75, after raising the ball or other valve 77 from its seating. The liquid cannot, in fact, pass through the aperture 70 of the piston 4$^a$, as very shortly after the piston has left its middle position, it makes contact with the disc 72 which is then raised by the piston, the spring 46$^f$ being compressed according to the rise of the piston.

When the piston descends towards its middle position, the liquid in the lower case 80, which is to return to the upper chamber 33, cannot pass through the conduit 81, as its orifice is closed by the wall of the piston 4$^a$, nor through the conduit 75, as the ball 77 is pressed upon its seating, and thus it is obliged to raise the valve 72, and the spring 46$^f$ offers to this lifting, and hence to the passage of the liquid, a resistance which increases according as the piston is separated from its middle position.

The operation is the same when the piston 4$^a$ descends from its middle position. In fact, during the descent, the liquid in the case 80 which is unable to pass through the conduit 75 on account of the ball 77, passes through the conduit 81 whose orifice 82 is uncovered by the piston. The liquid cannot pass through the central orifice 70 of the piston, as a very short time after the piston starts upon the descent, it makes contact with the disc 71 which is in fact brought down during the remainder of the descent of the piston. During this stroke, the action of the upper spring 46$^f$ decreases for this spring continues to expand, and thus the valve 71 is more strongly pressed upon its seating, since the action of the spring 42$^f$ now prevails. During the upward stroke of the piston 4$^a$ corresponding to the return to the middle position, the liquid which is to proceed from the upper chamber 33 to the case 80 cannot pass through the conduit 75, as its lower orifice 76 is closed by the piston, nor through the conduit 81 on account of the valve 83. It is thus obliged to raise the valve 71, which is more strongly pressed upon its seating according as the piston has descended to a greater degree during the forward stroke. As will be observed, this device corresponds entirely to the desired conditions.

Fig. 11 shows a modification in which the valves 71 and 72 represented in the preceding case are replaced by two discs 71' and 72', connected together by a cylindrical member 90 slidable in the aperture 70' of the piston 4$^b$ and having longitudinal apertures 91. The two discs 71'—72' have apertures at 92—93 co-operating with a ball 94 contained in the member 90.

The operation is as follows. During the rise of the piston 4$^b$, it makes contact with the disc 72', and thus the apertures 91 of the cylindrical member 90 will extend under the piston. The liquid will hence proceed from the chamber 33 through these apertures and passes freely into the lower case 80. The spring 46$^f$ is more strongly compressed as the piston rises. When the latter returns to the middle position, the liquid should pass from the case 80 into the upper chamber 33, but at this time the ball 94 is applied upon the orifice 93, so that the liquid is now obliged to raise the set of valves against the action of the spring 46$^f$ in order to pass through the lateral apertures 91 of the member 90. This lifting action is more difficult according as the piston is farther from its middle position.

The said device is quite symmetrical, and for this reason its operation is the same in the case in which the piston moves downwardly from its middle position.

Fig. 12 shows a modification of the device represented in Fig. 11. A single valve structure provided with conical ends 71$^a$ and 72$^a$ adapted to seat on correspondingly shaped valve seats 12 and 13 provided in the piston 4$^c$ is contained in the piston itself, which is operatively connected to the vehicle axle through the levers 5 and 7 pivoted at 6, and the single ball 94 is replaced by two balls 94$^a$ and 94$^b$ mounted in cages 95 and 96 secured to the valve structure 71$^a$—72$^a$. Apertures 91$^a$ are provided in said valve structure. The broken conduit at the lower part of said Figure 12 represents the connection with a container not shown and having the same function as container 27 in Fig. 1 and container 80 in Figs. 10 and 11.

The operation is quite the same as in the preceding case.

Having now described my invention what I claim as new and desire to secure by Letters Patent is:

1. In a damping device, in combination a container, fluid compressing means having two opposite walls adapted to be brought towards and away from each other, one of said walls separating said fluid compressing means from said container, a sliding member adapted to slide in said separating wall, two springs bearing respectively on the opposite ends of said sliding member and adapted to be compressed and expanded by the relative displacements of said opposite walls, a passage in said separating wall, through which said container and said fluid compressing means are adapted to communicate, obturating means carried on said sliding member and adapted to be brought into contact with said separating wall opposite said passage for a relative displacement between said opposite walls in one direction, communicating means between said container and said fluid compressing means, and valve means adapted to close said communicating means during a relative displacement between said opposite walls in the other direction.

2. In a damping device according to claim 1, the further feature consisting in that said communicating means is in the form of a conduit independent of said separating wall and of said sliding member.

3. In a damping device according to claim 1, the further feature consisting in that said communicating means is provided in said separating wall.

4. In a damping device according to claim 1, the further feature consisting in that said communicating means is provided in said sliding member.

5. In a damping device, in combination, a container, fluid compressing means having two opposite walls adapted to be brought towards and away from each other, one of said walls separating said fluid compressing means from said container, a sliding member adapted to slide in said separating wall, two springs bearing respectively on the opposite ends of said sliding member and adapted to be compressed and expanded by the relative displacements of said opposite walls, two communicating means between said container and said fluid compressing means, at each end of said sliding member an obturating member adapted to be brought into contact with said separating wall opposite one of said communicating means, each obturating member being brought into contact with said separating wall for a relative displacement between said opposite walls in a contrary direction to the relative displacement causing the other obturating member to be brought into contact with said separating wall, and valve means adapted to open one of said communicating means when the relative displacement between said opposite walls brings one of said obturating members into contact with said separating wall opposite the other communicating means and to close the same communicating means for a relative displacement of said opposite walls in a contrary direction.

6. In a damping device according to claim 5, the further feature consisting in that one of said communicating means is provided in said separating wall, the other communicating means is in the form of two conduits connecting said fluid compressing means with said container, said conduits opening at one end on either side of said separating wall in the inoperative position of said fluid compressing means, and at the other end at a distance from said separating wall at least equal to the greatest relative displacement between said opposite walls, and said valve means is in the form of a valve member provided in each conduit and adapted to be opened when the fluid in said conduit is circulated towards the end of said conduit adjacent to said separating wall.

7. In a damping device according to claim 5, the further feature consisting in that one of said communicating means is provided in said separating wall, the other communicating means and said valve means being provided in said sliding member.

8. In a damping device according to claim 5, the further feature consisting in that one of said communicating means is provided in said separating wall, the other communicating means being in the form of two conduits provided in said sliding member, each conduit being adapted to be closed by said valve means when the other conduit is adapted to be opened.

9. In a damping device according to claim 5, the further feature consisting in that one of said communicating means is provided in said separating wall, the other communicating means being in the form of a hole extending through said sliding member and of at least one lateral conduit connected with said hole and opening in the outer lateral wall of said sliding member towards the central portion of said member, and said valve means consists of at least one ball-shaped member adapted to intercept said hole on either side of said lateral conduit.

10. In a damping device, in combination, a container, fluid compressing means having two opposite walls adapted to be brought towards and away from each other, one of said walls separating said fluid compressing means from said container, a sliding member adapted to slide in said separating wall, two springs bearing respectively on the opposite ends of said sliding member and adapted to be compressed and expanded by the relative displacements of said opposite walls, two communicating means provided in said separating wall, two valve members disposed on either side of said separating wall, one valve member being provided for each communicating means, and at each end of said sliding member an abutment member, each corresponding to a valve member and adapted to move said valve member against said separating wall.

11. In a damping device according to claim 10, the further feature consisting in auxiliary spring means for each valve member bearing on one side on said valve member and on the other side on the corresponding abutment member.

JEAN MERCIER.